US008612949B2

(12) United States Patent
Liao et al.

(10) Patent No.: US 8,612,949 B2
(45) Date of Patent: Dec. 17, 2013

(54) METHODS AND APPARATUSES FOR COMPILER-CREATING HELPER THREADS FOR MULTI-THREADING

(75) Inventors: Shih-wei Liao, Palo Alto, CA (US); Xinmin Tian, Union City, CA (US); Gerolf F. Hoflehner, Santa Clara, CA (US); Hong Wang, Santa Clara, CA (US); Daniel M. Lavery, Santa Clara, CA (US); Perry Wang, San Jose, CA (US); Dongkeun Kim, San Jose, CA (US); Milind Girkar, Sunnyvale, CA (US); John P. Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 12/650,630

(22) Filed: Dec. 31, 2009

(65) Prior Publication Data

US 2010/0281471 A1 Nov. 4, 2010

Related U.S. Application Data

(63) Continuation of application No. 10/676,889, filed on Sep. 30, 2003, now abandoned.

(51) Int. Cl.
*G06F 9/45* (2006.01)

(52) U.S. Cl.
USPC .......................................... 717/150; 717/154

(58) Field of Classification Search
None
See application file for complete search history.

(56) References Cited

U.S. PATENT DOCUMENTS

| 5,249,295 | A | 9/1993 | Briggs et al. |
| 6,959,435 | B2 | 10/2005 | Ju et al. |
| 7,243,267 | B2 | 7/2007 | Klemm et al. |
| 2002/0095665 | A1 | 7/2002 | Chaudhry et al. |
| 2002/0097725 | A1 | 7/2002 | Dighe et al. |
| 2002/0120663 | A1 | 8/2002 | Binns |
| 2003/0074653 | A1 | 4/2003 | Ju et al. |
| 2003/0084433 | A1 | 5/2003 | Luk et al. |
| 2003/0101444 | A1 | 5/2003 | Wu et al. |
| 2003/0126591 | A1 | 7/2003 | Wu et al. |
| 2004/0054990 | A1 | 3/2004 | Liao et al. |
| 2004/0128489 | A1 | 7/2004 | Wang et al. |
| 2004/0154011 | A1 | 8/2004 | Wang et al. |

FOREIGN PATENT DOCUMENTS

| JP | 8263325 A | 10/1996 |
| JP | 2006267894 A | 10/2006 |

OTHER PUBLICATIONS

Kim et al. "A Study of Source-Level Compiler Algorithms for Automatic Construction of Pre-Execution Code", ACM Transactions on Computer Systems, 2001, vol. 2, No. 3, pp. 1-52.
Dulong et al., "An Overview of the Intel® IA-64 Compiler", Intel Technology Journal Q4 1999, 15 pages, Intel Corporation.

(Continued)

*Primary Examiner* — Jason Mitchell
(74) *Attorney, Agent, or Firm* — Barnes & Thornburg, LLP

(57) ABSTRACT

Methods and apparatuses for compiler-created helper thread for multi-threading are described herein. In one embodiment, exemplary process includes identifying a region of a main thread that likely has one or more delinquent loads, the one or more delinquent loads representing loads which likely suffer cache misses during an execution of the main thread, analyzing the region for one or more helper threads with respect to the main thread, and generating code for the one or more helper threads, the one or more helper threads being speculatively executed in parallel with the main thread to perform one or more tasks for the region of the main thread. Other methods and apparatuses are also described.

12 Claims, 15 Drawing Sheets

(56) References Cited

OTHER PUBLICATIONS

Hinton et al., "The Microarchitecture of the Pentium® 4 Processor", Intel Technology Journal 01 2001, 13 pages.

Roth et al., "Speculative Data-Driven Multithreading", Appears in the Proceedings of the 7th International Conference on High Performance Computer Architecture (HPCA-7), Jan. 22-24, 2001, 12 pages.

Huck et al., "Introducing the IA-64 Architecture", IEEE MICRO, Sep.-Oct. 2000, pp. 12-23, IEEE, Los Alamitos, CA, USA.

Marr et al., "Hyper-Threading Technology Architecture and Microarchitecture", Intel Technology Journal Q1 2002, 12 pages.

Laio et al., "Post-Pass Binary Adaptation for Software-Based Speculative Precomputation", PLDI'02, Jun. 17-19, 2002, Berlin, Germany, pp. 117-128.

Collins et al., "Speculative Precomputation: Long-range Prefetching of Delinquent Loads," IEEE 2001, pp. 14-25.

Kim et al., "Design and Evaluation of Compiler Algorithms for Pre-Execution", ASPLOS X, Oct. 2002, San Jose, CA, USA, pp. 159-170.

Chappell et al., "Simultaneous Subordinate Microthreading (SSMT)", IEEE, 1999, pp. 186-195.

Agrawal et al., "Dynamic Program Slicing", Proceedings of the ACM SIGPLAN'90 Conference on Programming Language Design and Implementation, While Plains, New York, Jun. 20-22, 1990, pp. 246-256.

Sundaramoorthy et al., "Slipstream Processors: Improving Both Performance and Fault Tolerance", A.C.M. (ASPLOS) Cambridge, MA, USA, Nov. 12-15, 2000, pp. 257-268.

Zilles et al., "Execution-based Prediction Using Speculative Slices", IEEE, 2001, pp. 2-13.

Collins et al., "Dynamic Speculative Precomputation", IEEE 2001, pp. 306-317.

Moshovos et al., "Slice-Processors: An Implementation of Operation-Based Prediction", ICS '01, Sorrento, Italy, ACM 2001, pp. 321-334.

Laio et al., "SUIF Explorer: An Interactive and Interprocedural Parallelizer," PPoPP '99, May 1999, Atlanta, GA. USA. 1999 ACM, pp. 37-48.

Tullsen et al., "Simultaneous Multithreading: Maximizing On-Chip Parallelism", ISCA '95, Santa Margherita. Ligure, Italy, 1995 ACM, pp. 392-403.

Luk, "Tolerating Memory Latency Through Software-Controlled Pre-Execution in Simultaneous Multithreading Processors", IEEE 2001, pp. 40-51.

Ghiya et al., "On the Importance of Points-To Analysis and Other Memory Disambiguation Methods for C Programs", PLDI 2001 Jun. 2001, Snowbird, Utah, USA, 2001 ACM ISBN, pp. 47-58.

Annavaram et al., "Data Prefetching by Dependence Graph Precomputation", IEEE 2001, pp. 52-61.

Wang et al., "Speculative Precomputation: Exploring the Use of Multithreading for Latency", Intel Technology Journal Q1 2002. vol. 6 Issue 1, 14 pages.

Tian et al., "Intel® OpenMP C++/Fortran Compiler for Hyper-Threading Technology: Implementation and Performance" Intel Technology Journal Q1 2002. vol. 6 Issue 1, 11 pages.

Moritz, "Tutorials PACT 2003", PACT 2003 (12th Annual International Conference on Parallel Architecture and Compilation Techniques) Conference Program—Tutorials, Sep. 16, 2003, XP002348822, URL: www.ecs.umass.edu/ece/andras/pact_2003_tutorials.htm.

Yeung, "Tutorial on Architecture and Compiler Support for Speculative Precomputation" Tutorial Outline (PACT 2003), XP002348826, URL: http://maggini.eng.umd.edulvortexltutorial.

Liao, "Speculative Precomputation on Intel Architectures" Tutorial on Architecture and Compiler Support for Speculative Precomputation—12m Annual International Conference on Parallel Architectures and Compilation Techniques—New Orleans, Louisiana, Sep. 27-Oct. 1, 2003, XPo02348823, URL: http://maggini.eng.umd.edu/vortex/tutorial/slides/industry.pdf.

Dorai, "Optimizing SMT Processors for High Single-Thread Performance", The Journal of Instruction-Level Parllelism, vol. 5, Apr. 2003.

Ammons et al., "Exploiting Hardware Performance Counters with Flow and Context Sensitive Profiling", 1997, ACM SIGPLAN, pp. 85-96.

Wallace et al., "Threaded Multiple Path Execution", 1998, ACM SIGARCH Computer Architecture News, vol. 26 i3, pp. 238-249.

International Search Report and Written Opinion received for PCT Patent Application No. PCT/US2004/032461, mailed on Aug. 11, 2005, 10 pages.

International Preliminary Report on Patentability and Written Opinion received for PCT Patent Application No. PCT/US2004/032461, mailed on Apr. 13, 2006, 8 pages.

Office Action Received for Chinese Patent Application No. 200480027172.2, mailed on May 17, 2012, 11 Pages Of Office Action including 5 pages of unofficial English Translation.

Office Action Received for Chinese Patent Application No. 200480027172.2, mailed on Aug. 12, 2011, 23 Pages of Office Action including 8 pages of unofficial English Translation.

Office Action Received for Japanese Patent Application No. 2006-528333, mailed on May 25, 2010, 7 Pages of Office Action including 4 pages of unofficial English Translation.

Office Action Received for Japanese Patent Application No. 2006-528333, mailed on Dec. 7, 2010, 2 Pages of Office action including 1 page of unofficial English Translation.

Shu Wada, "Aspect-oriented Programming", Java World, IDG Japan, Inc., Jul. 1, 2002, vol. 6, 7th Issue, pp. 084-099 (Domestic Technology Magazine No. 2003-02126-003).

Matsui et al., "Design and Realization of Parallel EusLisp using multi threads", Journal of Information Processing, Information Processing Society of Japan, Aug. 15, 1995, vol. 36, 8th Issue, pp. 1885-1896 (Domestic Technology Magazine No. 2000-00853-014). English abstract included.

```
void foo_main(LIST *p)
{
  ....
  { while (p != NULL) {
      ...
      do_work1(p->data1, 10);
      do_work2(p->data2, 20);
      ...
      p = p->next;
    }
  }
}

(I) Serial code
```
901

Fig. 9A

```
void foo_main(LIST *p)
{ mc = X; M=1; _ssp_begin();
  _ssp_spawn_helper(... helper_foo, ...p...);
  while (p != NULL) {
      do_work1(p->data1, 10);
      do_work2(p->data2, 20);
      mc = mc + 1;
      if (mc > M*X) {
          M++; _ssp_post(helper_tid);
      }
      p = p->next;
  }
  _ssp_end();
}        (II) Main thread code
```
902

Fig. 9B

```
T-entry foo_helper: captureprivate(p)
{ hc = 0; H = 1; local_p = p;
  while (local_p != NULL) {
    non_faulting_load(local_p->data1);
    non_faulting_load(local_p->data2);
    hc = hc + 1;
    if (hc > H*X && hc > mc)
    { H++; _ssp_wait(main_tid); }
    else if (hc <= mc) {
      (hc, local_p, H) = catchup(mc, p, M);
    }
    local_p = local_p->next;
  }
T-ret }   (III) Helper thread code
```
903

FOREACH THREAD CHAIN
    FOREACH THREAD IN BOTTOM UP ORDER
        READ_RESOURCE_TABLE_FOR_CHILDREN_THREAD();
        PREALLOCATE_REGISTERS();                            } 1101
        ALLOCATE_REMAINING_REGISTERS();
        WRITE_RESOURCE_TABLE ();
    ENDFOR
ENDFOR

FOR MAIN THREAD DO
    READ_RESOURCE_TABLE_FOR_CHILDREN_THREAD_AT_EACH_SPAWN();
    PREALLOCATE_REGISTERS();                                } 1102
    ALLOCATE_REMAINING_REGISTERS();
DONE
```

| Thread ID 1201 | Written Resources 1202 | Live-in Resources 1203 |
|---|---|---|
| Helper Thread 2 | R4, R5 | (V5, R2)<br>(V6, R3) |
| Helper Thread 1 | R2, R3, R4,<br>R5, R8, R9 | (V3, R6)<br>(V4, R7) |
| Helper Thread 3 | ... | ... |
| ... | ... | ... |
| Helper Thread n | ... | ... |
| Main Thread | ... | ... |

Fig. 12

METHODS AND APPARATUSES FOR COMPILER-CREATING HELPER THREADS FOR MULTI-THREADING

CROSS-REFERENCE TO RELATED APPLICATION

This application is a Continuation Application to U.S. patent application Ser. No. 10/676,889, entitled "Methods And Apparatuses For Compiler-Creating Helper Threads For Multi-Threading," filed on 30 Sep. 2003 now abandoned by Shih-Wei Liao, et al., assigned to a common assignee, the entire subject matter which is herein incorporated by reference.

FIELD

Embodiments of the invention relate to information processing system; and more specifically, to compiler-created helper threads for multi-threading.

BACKGROUND

Memory latency has become the critical bottleneck to achieving high performance on modern processors. Many large applications today are memory intensive, because their memory access patterns are difficult to predict and their working sets are becoming quite large. Despite continued advances in cache design and new developments in prefetching techniques, the memory bottleneck problem still persists. This problem worsens when executing pointer-intensive applications, which tend to defy conventional stride-based prefetching techniques.

One solution is to overlap memory stalls in one program with the execution of useful instructions from another program, thus effectively improving system performance in terms of overall throughput. Improving throughput of multi-tasking workloads on a single processor has been the primary motivation behind the emerging simultaneous multithreading (SMT) techniques. An SMT processor can issue instructions from multiple hardware contexts, or logical processors (also referred to as hardware threads), to the functional units of a superscalar processor in the same cycle. SMT achieves higher overall throughput by increasing overall instruction-level parallelism available to the architecture via the exploitation of the natural parallelism between independent threads during each cycle.

SMT can also improve the performance of applications that are multithreaded. However, SMT does not directly improve the performance, in terms of reducing latency, of single-threaded applications. Since the majority of desktop applications in the traditional PC environment are still single-threaded, it is important to investigate if and how SMT resources can be exploited to enhance single-threaded code performance by reducing its latency.

BRIEF DESCRIPTION OF THE DRAWINGS

The invention may best be understood by referring to the following description and accompanying drawings that are used to illustrate embodiments of the invention. In the drawings:

FIGS. 9A-9C show pseudo code for an application, a main thread, and a helper thread according to one embodiment.

FIG. 11 is a block diagram illustrating an exemplary pseudo code for allocating resources for the threads according to one embodiment.

FIG. 12 is a block diagram illustrating an exemplary resource data structure containing resource information for the threads according to one embodiment.

DETAILED DESCRIPTION

Figure 1:
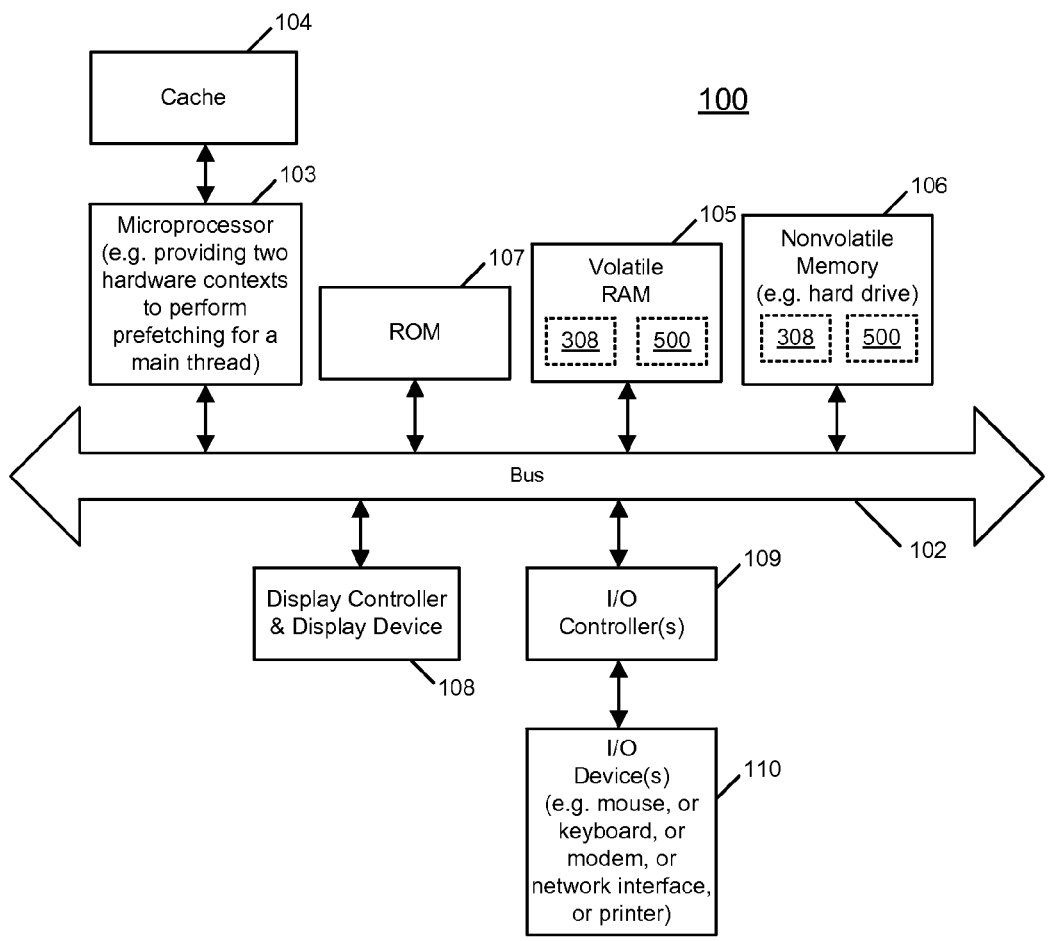
FIG. 1 illustrates a computer system having multi-threading capability according to one embodiment.

Methods and apparatuses for compiler-creating helper threads for multi-threading systems are described. According to one embodiment, a compiler, also referred to as Auto-Helper, that implements thread-based prefetching helper threads on a multi-threading system, such as, for example, the Intel Pentium™4 Hyper-Threading systems, available from Intel Corporation. In one embodiment, the compiler automates the generation of helper threads for Hyper-Threading processors. The techniques focus at identifying and generating helper threads of minimal sizes that can be executed to achieve timely and effective data prefetching, while incurring minimal communication overhead. A runtime system is also implemented to efficiently manage the helper threads and the synchronization between threads. Consequently, helper threads are able to issue timely prefetches for the sequential pointer-intensive applications.

In addition, hardware resources such as register contexts may be managed for helper threads within a compiler. Specifically, the register set may be statically or dynamically partitioned between main thread and helper threads, and between multiple helper threads. As a result, the live-in/live-out register copies via memory for threads may be avoided and the threads may be destroyed at compile-time, when the compiler runs out of resources, or at runtime when infrequent cases of certain main thread event occurs.

In the following description, numerous specific details are set forth. However, it is understood that embodiments of the invention may be practiced without these specific details. In other instances, well-known circuits, structures and techniques have not been shown in detail in order not to obscure the understanding of this description.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

Embodiments of the present invention also relate to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS) such as Dynamic RAM (DRAM), erasable programmable ROMs (EPROMs), electrically erasable programmable ROMs (EEPROMs), magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, embodiments of the present invention are not described with reference to any particular programming language. It will be appreciated that a variety of programming languages may be used to implement the teachings of the embodiments of the invention as described herein.

A machine-readable medium includes any mechanism for storing or transmitting information in a form readable by a machine (e.g., a computer). For example, a machine readable medium includes read only memory ("ROM); random access memory ("RAM); magnetic disk storage media; optical storage media; flash memory devices; electrical, optical, acoustical or other form of propagated signals (e.g., carrier waves, infrared signals, digital signals, etc.); etc.

FIG. 1 is a block diagram of an exemplary computer which may be used with an embodiment. For example, exemplary system 100 shown in FIG. 1 may perform the processes shown in FIGS. 5-8. Exemplary system 100 may be a multi-threading system, such as an Intel Pentium™4 Hyper-Threading system. Exemplary system 100 may be a simultaneous multithreading (SMT) or chip multiprocessing (CMP) enabled system.

Note that while FIG. 1 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 1, the computer system 100, which is a form of a data processing system, includes a bus 102 which is coupled to a microprocessor 103 and a ROM 107, a volatile RAM 105, and a non-volatile memory 106. The microprocessor 103, which may be a Pentium processor from Intel Corporation or a PowerPC processor from Motorola, Inc., is coupled to cache memory 104 as shown in the example of FIG. 1. The bus 102 interconnects these various components together and also interconnects these components 103, 107, 105, and 106 to a display controller and display device 108, as well as to input/output (I/O) devices 110, which may be mice, keyboards, modems, network interfaces, printers, and other devices which are well-known in the art. Typically, the input/output devices 110 are coupled to the system through input/output controllers 109. The volatile RAM 105 is typically implemented as dynamic RAM (DRAM) which requires power continuously in order to refresh or maintain the data in the memory. The non-volatile memory 106 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers, and/or adapters, as is well-known in the art. In one embodiment, the I/O controller 109 includes a USB (Universal Serial Bus) adapter for controlling USB peripherals or a PC1 controller for controlling PC1 devices, which may be included in IO devices 110. In a further embodiment, I/O controller 109 includes an IEEE-1394 controller for controlling IEEE-1394 devices, also known as FireWire devices.

According to one embodiment, processor 103 may include one or more logical hardware contexts, also referred to as logical processors, for handling multiple threads simultaneously, including a main thread, also referred to as a non-speculative thread, and one, or more helper threads, also referred to as speculative threads, of an application. Processor 103 may be a Hyper Threading processor, such as a Pentium 4 or a Xeon processor capable of performing multithreading processes from Intel Corporation. During an execution of an application, the main thread and one or more helper threads are executed in parallel. The helper threads are speculatively executed associated with, but somewhat independent to, the main thread to perform some precomputations, such as speculative prefetches of addresses or data, for the main thread to reduce the memory latency incurred by the main thread.

According to one embodiment, the code of the helper threads (e.g., the source code and the binary executable code) are generated by a compiler, such as AutoHelper compiler available from Intel Corporation, loaded and executed in a memory, such as volatile RAM 105, by an operating system (Os) executed by a processor, such as processor 103. The operating system running within the exemplary system 100 may be a Windows operating system from Microsoft Corporation or a Mac OS from Apple Computer. Alternatively, the operating system may be a Linux or Unix operating system. Other operating systems, such as embedded real-time operating systems, may be utilized.

Current Hyper-Threading processors typically provide two hardware contexts, or logical processors. To improve the performance of a single-threaded application, Hyper-Threading technology can utilize its second context to perform prefetching for the main thread. Having a separate context allows the helper threads' execution to be decoupled from the control flow of the main thread, unlike software prefetching. By running far ahead of the main thread to perform long-range prefetches, the helper threads can trigger prefetches early, and eliminate or reduce the cache miss penalties experienced by the main thread.

With AutoHelper, a compiler is able to automatically generate prefetching helper threads for Hyper-Threading machines. The helper threads aim at bringing the latency-hiding benefit of multithreading to sequential workloads. Unlike threads produced by the conventional parallelizing compilers, the helper threads only prefetch for the main thread, which does not reuse the computed results from the helper threads. According to one embodiment, the program correctness is still maintained by the main thread's execution, while the helper threads do not affect program correctness and are used solely for performance improvement. This attribute permits the use of more aggressive forms of optimization in generating helper threads. For example, when the main thread does not need help, certain optimizations may be performed, which are not possible with conventional throughput threading paradigm.

In one embodiment, if it is predicted that a helper is not needed for a certain period of time, the helper may terminate and release all the resources associate with the helper to main thread. According to another embodiment, if it is predicted that a helper may be needed shortly, the helper may be in a pause mode, which still consumes some resources on Hyper-Threading hardware. Exponential back-off (via halting) will be invoked if the helper stays in the pause mode too long (e.g., exceeding a programmable timeout period). According to a further embodiment, if the compiler cannot predict when the helper thread will be needed, the helper may be in a snooze mode and may relinquish the occupied processor resources to the main thread.

Furthermore, according to one embodiment, performance monitoring and on-the-fly adjustments are made possible under helper-threading paradigm, because the helper thread does not contribute to the semantics of the main program. When a main thread needs a helper, it will wake up the main thread. For example, with respect to a run-away helper or a run-behind thread, one of the processes described above may be invoked to adjust the run-away helper thread.

Figure 2:
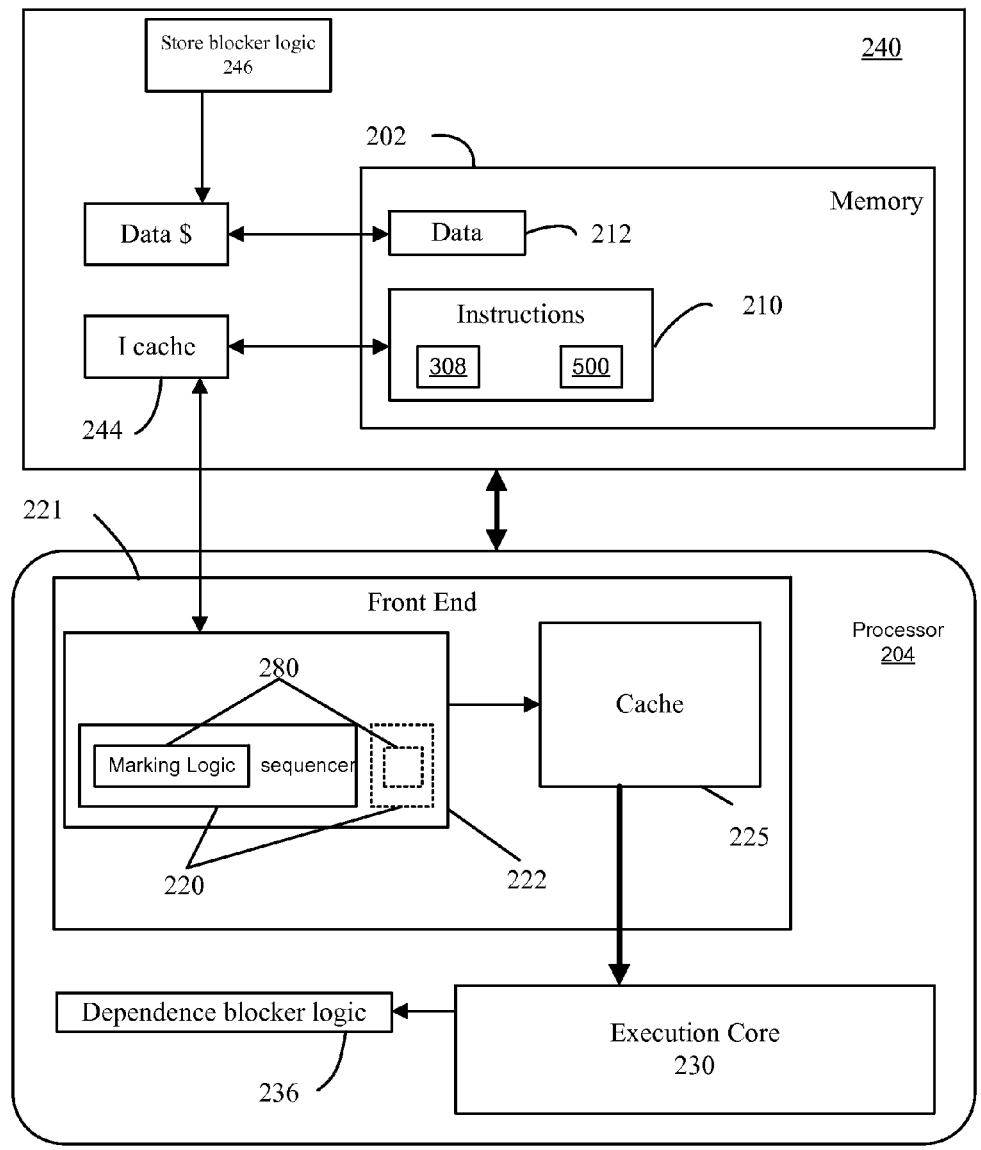
FIG. 2 illustrates a computer system having multi-threading capability according to an alternative embodiment.

FIG. 2 is a block diagram illustrating one embodiment of a computing system 200 capable of performing the disclosed techniques. In one embodiment, the computing system 200 includes a processor 204 and a memory 202. Memory 202 may store instructions 210 and data 212 for controlling the operation of the processor 204. The processor 204 may include a front end 221 that supplies instruction information to an execution core 230. The front end 221 may supply the instruction information to the processor core 204 in program order.

For at least one embodiment, the front end 221 includes a fetch/decode unit 222 that includes logically independent sequencers 220 for each of a plurality of thread contexts. The logically independent sequencer(s) 220 may include marking logic 280 to mark the instruction information for speculative threads as being "speculative." One skilled in the art will recognize that, for an embodiment implemented in a multiple processor multithreading environment, only one sequencer 220 may be included in the fetch/decode unit 222.

As used herein, the term "instruction information" is meant to refer to instructions that can be understood and executed by the execution core 230. Instruction information may be stored in a cache 225. The cache 225 may be implemented as an execution instruction cache or an execution trace cache. For embodiments that utilize an execution instruction cache, "instruction information" includes instructions that have been fetched from an instruction cache and decoded. For embodiments that utilize a trace cache, the term "instruction information" includes traces of decoded micro-operations. For embodiments that utilize neither an execution instruction cache nor trace cache, "instruction information" also includes raw bytes for instructions that may store in an instruction cache such as I cache 244.

Figure 3:
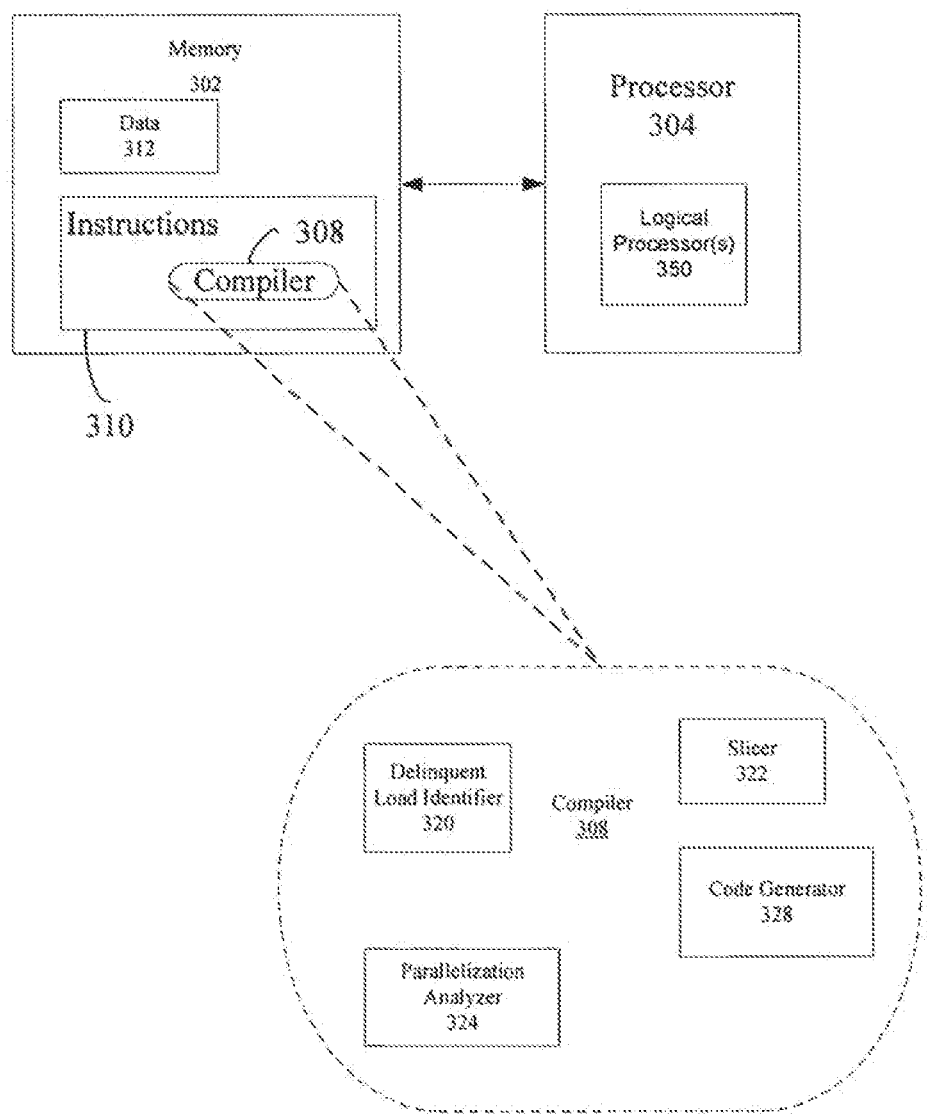
FIG. 3 illustrates a computer system having a compiler capable of generating a helper thread according to one embodiment.

FIG. 3 is a block diagram illustrating an exemplary system containing a compiler to generate one or more helper threads according to one embodiment. Referring to FIG. 3, exemplary processing system 300 includes a memory system 302 and a processor 304. Memory system 302 may store instructions 310 and data 312 for controlling the operation of the processor 304. For example, instructions 310 may include a compiler program 308 that, when executed, causes the processor 304 to compile a program that resides in the memory system 302. Memory 302 holds the program to be compiled, intermediate forms of the program, and a resulting compiled program. For at least one embodiment, the compiler program 308 includes instructions to generate code for one or more helper threads with respect to a main thread.

Memory system 302 is intended as a generalized representation of memory and may include a variety of forms of memory, such as a hard drive, CD-ROM, random access memory (RAM), dynamic random access memory (DRAM), static random access memory (SRAM) and related circuitry. Memory system 302 may store instructions 310 and/or data represented by data signals that may be executed by processor 304. The instructions 310 and/or data may include code for performing any or all of the techniques discussed herein.

Specifically, compiler 308 may include a delinquent load identifier 320 that, when executed by the processor 304, identifies one or more delinquent load regions of a main thread. The compiler 308 may also include a parallelization analyzer 324 that, when executed by the processor 304, performs one or more parallelization analysis for the helper threads. Also, the compiler 308 may include a slicer 322 that identifies one or more slices to be executed by a helper thread in order to perform speculative precomputation. The compiler 308 may further include a code generator 328 that, when executed by the processor 304, generates the code (e.g., source and executable code) for the helper threads.

Figure 4A:
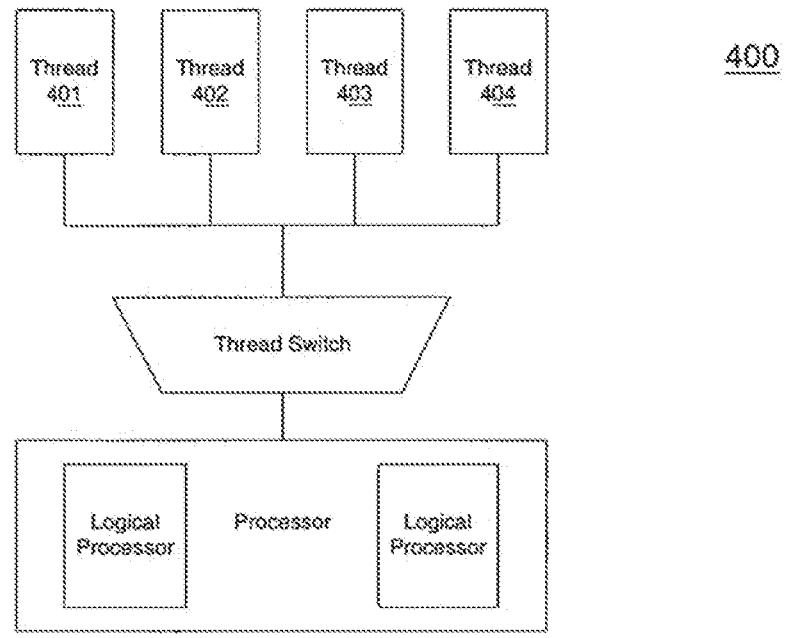
FIG. 4A illustrates a typical symmetric multi-threading process.
Figure 4B:
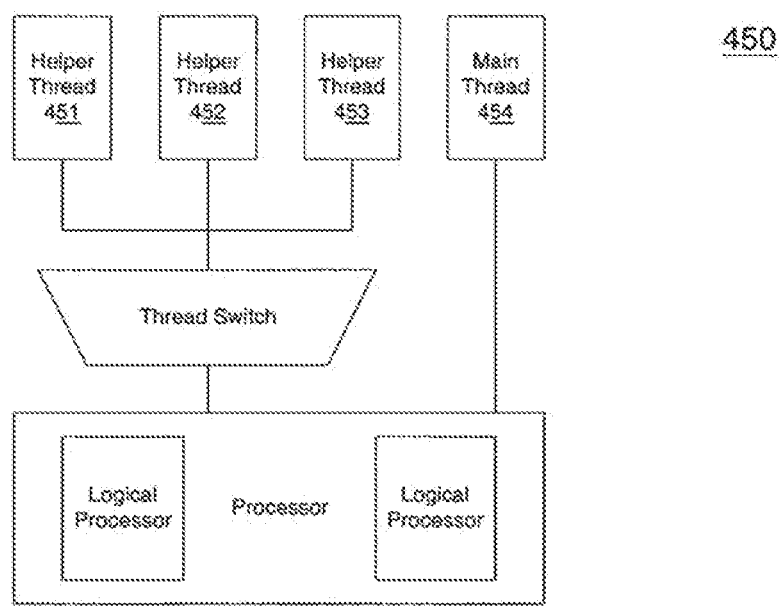
FIG. 4B illustrates an asymmetric multi-thread process according to one embodiment.

Executing helper threads in an SMT machine is a form of asymmetric multithreading, as shown in FIG. 4B according to one embodiment. Traditional parallel programming models provide symmetric multithreading, as shown in FIG. 4A. In contrast, the helper threads, such as helper threads 451-454 in FIG. 4B execute as user-level threads (fibers) with lightweight thread invocation and switching. Furthermore, symmetric multithreading requires well-tuned data decomposition across symmetric threads, such as threads 401-404 in FIG. 4A. In the helper thread model, according to one embodiment, the main thread runs the sequential code that operates on the entire data set, without incurring data decomposition overhead. Without decomposing the data, the compiler instead focuses on providing multiple helpers for timely prefetches for the main thread's data.

Figure 5:
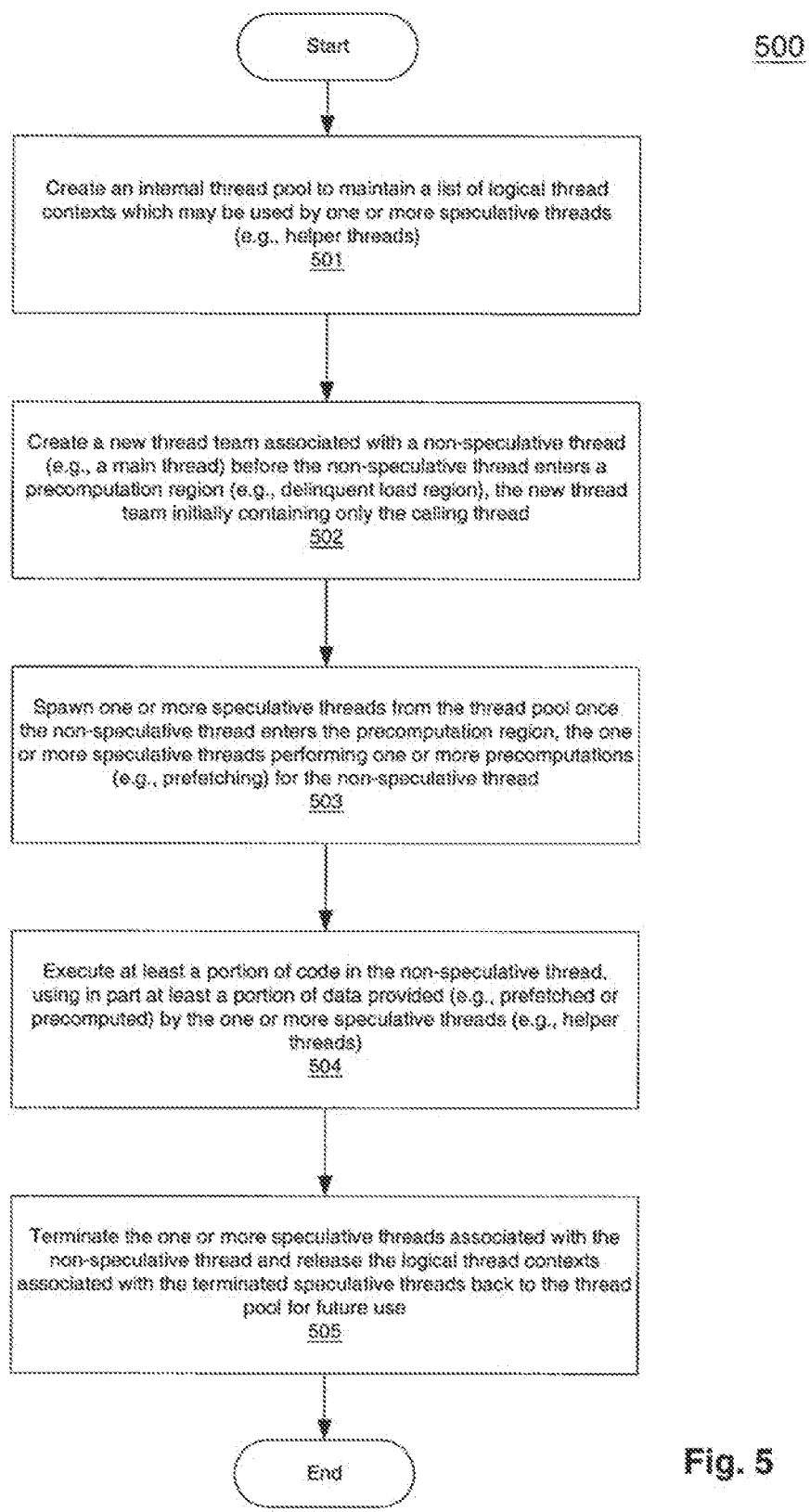
FIG. 5 is flow diagram illustrating an exemplary process for executing one or more helper threads according to one embodiment.

FIG. 5 is a flow diagram illustrating an exemplary process for executing a helper thread according to one embodiment. Exemplary process 500 may be performed by a processing logic that may comprise hardware (circuitry, dedicated logic, etc.), software (such as is run on a general purpose computer system or a dedicated machine), or a combination of both. In one embodiment, exemplary process 500 includes executing a main thread of an application in a multi-threading system, and spawning one or more helper threads from the main thread to perform one or more computations for the main thread when the main thread enters a region having one or more delinquent loads, code of the one or more helper thread being created during a compilation of the main thread.

Referring to FIG. 5, at block 501, the processing logic creates an internal thread pool to maintain a list of logical thread contexts which may be used by one or more helper threads. At block 502, a new thread team may be created before a main thread enters a delinquent load region (e.g., precomputation region) which may be identified by a compiler. In one embodiment, the new thread team initially contains only the calling thread. According to one embodiment, the compiler may insert a statement, such as start-helper statement, before the main thread enters the region to activate one or more helper threads. At block 503, when the main thread enters the region, the main thread spawns (via a function call, such as invoke-helper) one or more helper threads which are created using the resources from the thread pool to perform one or more precomputations, such as prefetching addresses and data, for the main thread. According to one embodiment, if no logical processor is available for executing the spawned helper threads, the helper threads may be created and placed in a run queue for the thread team for subsequent execution. In one embodiment, the run queue may be associated with a time-out. The request to invoke a helper is simply dropped (e.g., terminated) after the time-out period expires, assuming that the prefetch will no longer be timely. This is different from traditional task-queue model for parallel programming, where each task needs to be executed.

At block 504, at least a portion of the code within the region of the main thread is executed using in part the data (e.g., prefetched or precomputed) provided by the one or more helper threads. According to one embodiment, the results computed by a helper thread are not integrated into the main thread. The benefit of a helper thread lies in its side effects of prefetching, not in reusing its computation results. This allows the compiler to aggressively optimize the code generation for helper threads. The main thread handles the correctness issue, while the helper threads target the performance of a program. This also allows the helper thread invoking statement, such as invoke_helper, to drop requests whenever deemed appropriate. Finally, non-faulting instructions, such as the prefetch instructions, may be used to avoid disruptions to the main thread if exceptions are signaled in a helper thread.

At block 505, the one or more helper threads associated with the main thread are terminated (via a function call, such as finish-helper) when the main thread is about to exit the delinquent load region and the resources, such as logical thread contexts, associated with the terminated helper threads are released back to the thread pool. This enables future requests to immediately recycle the logical thread contexts from the thread pool. Other operations apparent to those with ordinary skill in the art may be included.

Hyper-Threading technology is well suited for supporting the execution of one or more helper threads. According to one embodiment, in each processor cycle, instructions from either of the logical processors can be scheduled and executed simultaneously on shared execution resources. This allows helper threads to issue timely prefetches. In addition, the entire on-chip cache hierarchy is shared between the logical processors, which is useful for helper threads to effectively prefetch for the main thread at all levels of the cache hierarchy. Furthermore, although the physical execution resources are shared between the logical processors, the architecture state is duplicated in a Hyper-Threading processor. The execution of helper threads will not alter the architecture state in the logical processor executing the main thread.

However, on Hyper-Threading technology enabled machines, helper threads can still impact the execution of main thread due to the writes to memory. Because helper threads share memory with the main thread, the execution of helper threads should be guaranteed not to write to the data structures of the main thread. In one embodiment, the compiler (e.g., AutoHelper) provides memory protection between the main thread and the helper threads. The compiler removes stores to non-local variables in the helper threads.

Figure 6:
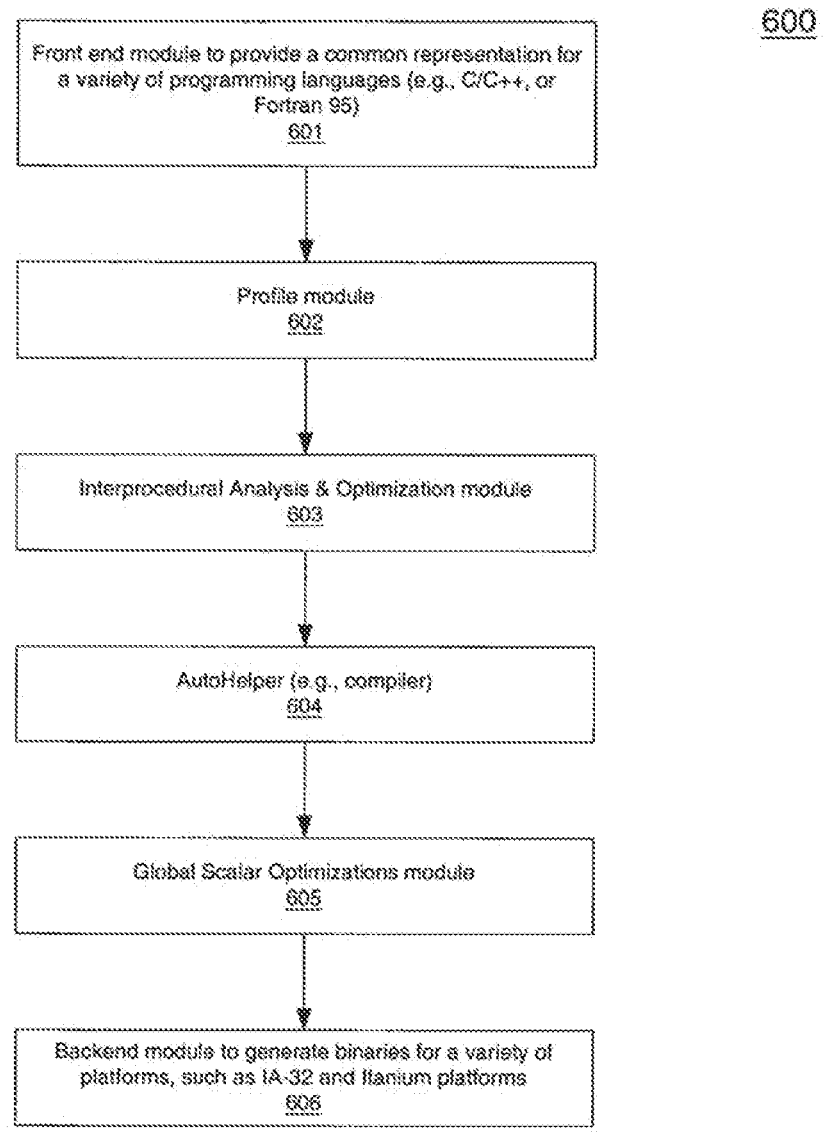
FIG. 6 is a block diagram illustrating exemplary software architecture of a multithreading system according to one embodiment.

FIG. 6 is a block diagram illustrating an exemplary architecture of a compiler according to one embodiment. In one embodiment, exemplary architecture 600 includes, among others, a front end module 601, profiler 602, interprocedural analysis and optimization module 603, compiler 604, global scalar optimization module 605, and backend module 606. In one embodiment, front end module 601 provides a common intermediate representation, such as 1LO representation from Intel Corporation, for source codes written in a variety of programming languages, such as C/C++ and Fortran. As a result, the compiler, such as AutoHelper 604 is applicable irrespective of the source languages and of the target platforms. Profiler 602 performs a profiling run to examine the characteristics of the representation. Interprocedural analysis module 603 may exposes optimization opportunities across procedure call boundaries. Thereafter, the compiler 604 (e.g., AutoHelper) is invoked to generate code for one or more helper threads. Global scalar optimization module 605 applies, using partial redundancy elimination to minimize the number of times an expression is evaluated. Finally, backend module 606 generates binary code for the helper threads for a variety of platforms, such as IA-32 or Itanium platform from Intel Corporation. Other components apparent to those with ordinary skill in the art may be included.

Unlike a conventional approach, AutoHelper (e.g., the compiler) eliminates the profile-instrumentation pass to make the tool easier to use. According to one embodiment, the compiler can directly analyze the output from profiling results, such as those generated by Intel's VTune™ Performance Analyzer, which is enabled for Hyper-Threading technology. Because it is a middle-end pass instead of a post-pass tool, the compiler is able to utilize several product-quality analyses, such as array dependence analysis and global scalar optimization, etc. These analyses, invoked after the compiler, perform aggressive optimizations on the helper threads' code.

According to one embodiment, the compiler generates one or more helper threads to precompute and prefetch the address accessed by a load that misses the cache frequently, also referred to as a delinquent load. The compiler also generates one or more triggers in the main thread that spawns one or more helper threads. The compiler implements the trigger as an invoking function, such as the invoke-helper function call. Once the trigger is reached, the load is expected to appear later in the instruction stream of the main thread, hence the speculatively executed helper threads can reduce the number of cache misses in the main thread.

Figure 7:
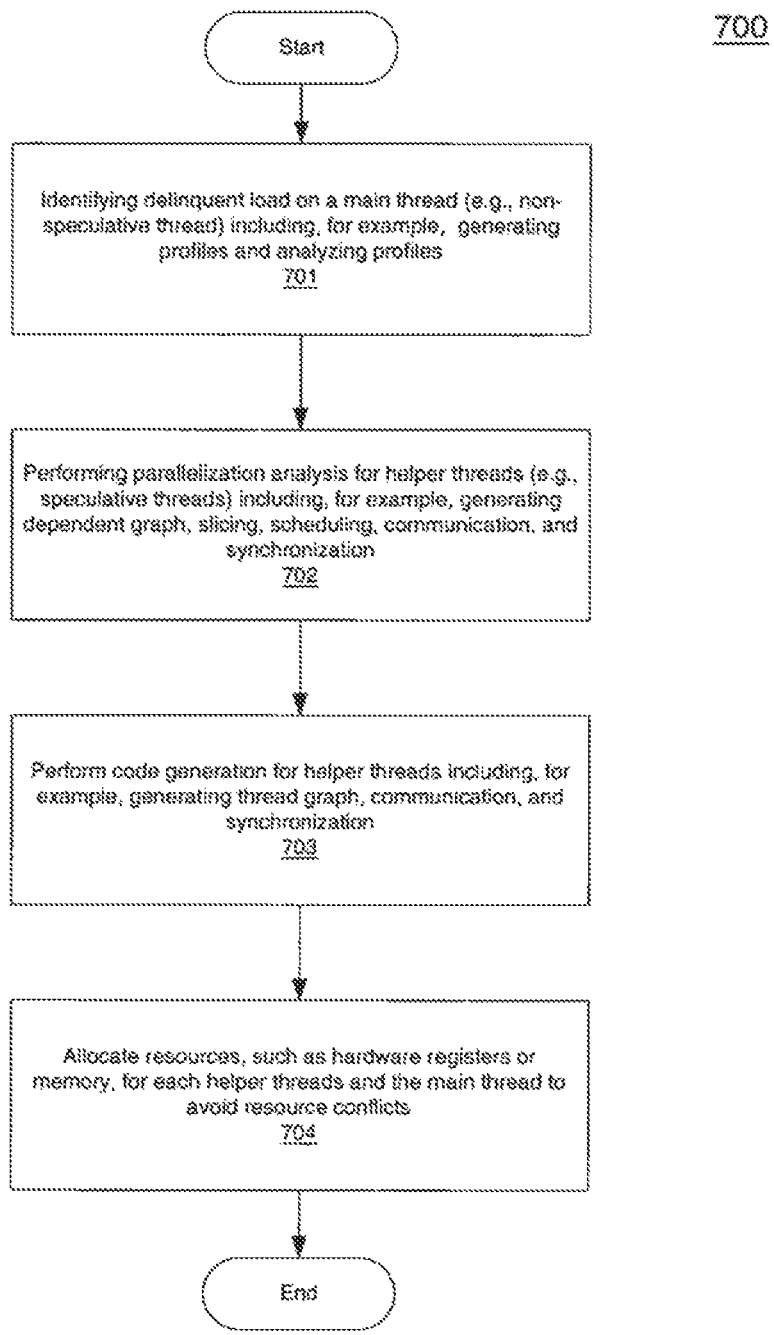
FIG. 7 is a flow diagram illustrating an exemplary process for generating a helper thread according to one embodiment.

FIG. 7 is flow diagram illustrating an exemplary process performed by a compiler, such as AutoHelper, according to one embodiment. Exemplary process 700 may be performed by a processing logic that may comprise hardware (circuitry, dedicated logic, etc.), software (such as is run on a general purpose computer system or a dedicated machine), or a combination of both. In one embodiment, exemplary process 700 starts at block 701, to identifying delinquent loads using, for example, the VTune tool from Intel Corporation, to perform parallelization analysis for helper threads (block 702), to generate code for helper threads (block 703), and to allocate resources, such as hardware registers or memories for each helper threads and the main thread (block 704), which will be described in details further below.

According to one embodiment, the compiler identifies the most delinquent loads in an application source code using one or more run-time profiles. Traditional compilers collect the profiles in two steps: profile-instrumentation and profile-generation. However, because cache miss is not an architecture feature that is exposed to the compilers, profile-instrumentation pass does not permit instrumentation of cache misses for the compiler to identify delinquent loads. The profiles for each cache hierarchy are collected via a utility, such as the VTune™ Analyzer from Intel Corporation. In one embodiment, the application may be executed with debugging information in a separate profiling run prior to the compiler. During the profiling run, cache misses are sampled and the hardware counters are accumulated for each static load in the application.

The compiler identifies the candidates for thread-based prefetching. In a particular embodiment, the VTune™ summarizes the cache behavior on a per-load basis. Because the binary for the profiling run is compiled with the debug information (e.g., debug symbols), it is possible to correlate the profiles back to source line numbers and the statements. Certain loads that contribute more than a predetermined threshold may be identified as delinquent loads. In a particular embodiment, the top loads that contribute to 90% of cache misses are denoted as delinquent loads.

In addition to identifying delinquent load instructions, the compiler generates helper threads that compute the addresses of delinquent loads accurately. In one embodiment, separate code for helper threads is generated. The separation between the main thread and the helper thread's code prevents transformations on a helper thread's code from affecting the main thread. In one embodiment, the compiler uses multi-entry threading instead of conventional out-lining, in the Intel product compiler to generate separate codes for helper threads.

Furthermore, according to one embodiment, the compiler performs multi-entry threading at the granularity of a compiler-selected code region, denoted as precomputation region. This region encompasses a set of delinquent loads and defines the scope for speculative precomputation. In one embodiment, the implementation usually targets loop regions, because loops are usually the hot spots in program execution, and the delinquent loads are the loads that were executed many times, usually in a loop.

Figure 8:
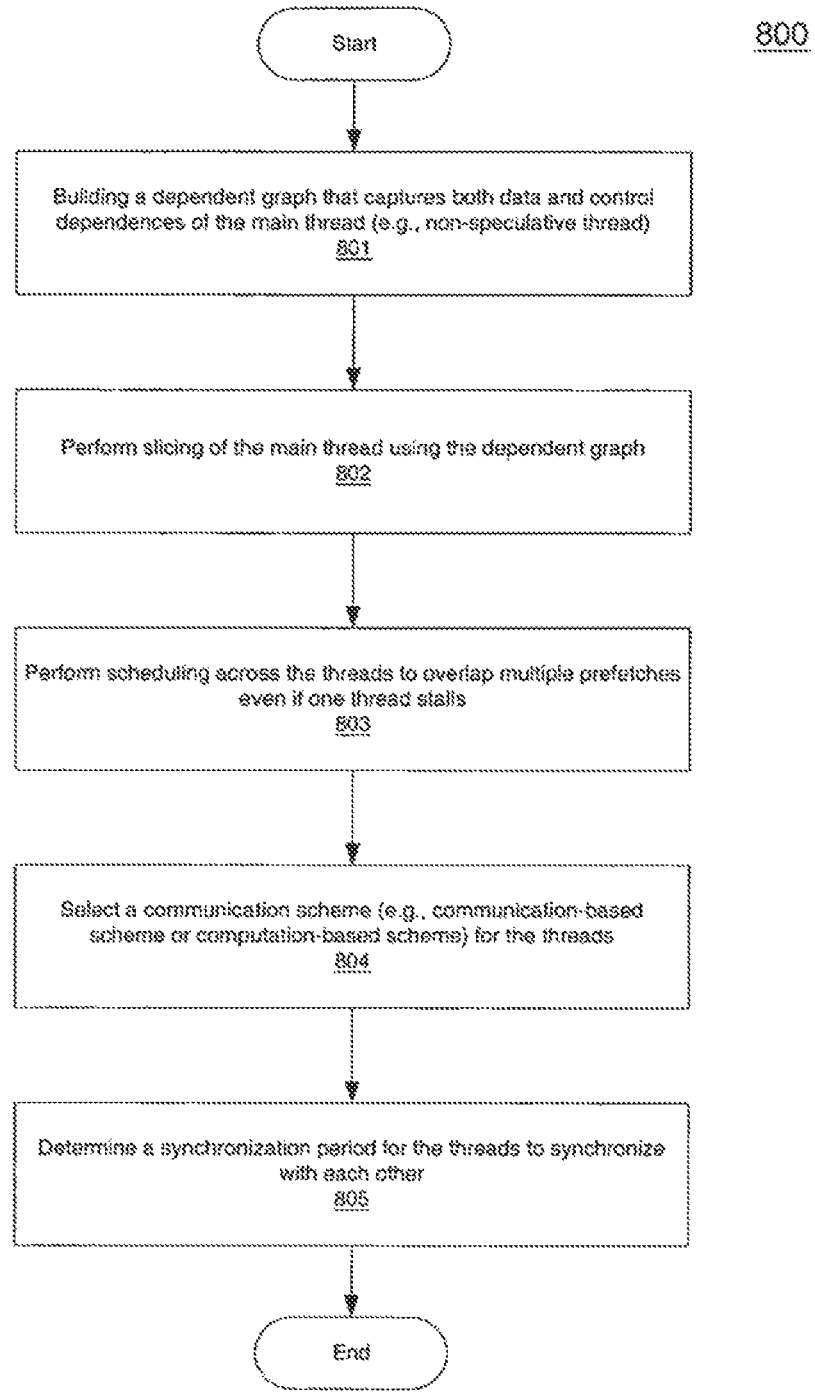
FIG. 8 is a flow diagram illustrating an exemplary process for parallelization analysis according to one embodiment.

FIG. 8 is flow diagram illustrating an exemplary process for parallelization analysis according to one embodiment. Exemplary process 800 may be performed by a processing logic that may comprise hardware (circuitry, dedicated logic, etc.), software (such as is run on a general purpose computer system or a dedicated machine), or a combination of both. Referring to FIG. 8, at block 801, the processing logic builds a dependent graph that captures both data and control dependencies of the main thread. According to one embodiment, in order to filter out unrelated code and thus reduce the size of a helper thread's code, the compiler first builds a graph that captures both data and control dependences. The effectiveness and legality of filtering rely on the compiler's ability to accurately disambiguate memory references. As a result, a memory disambiguation module in the compiler is invoked to disambiguate pointers to dynamically allocated objects. Because a pointer could be a global variable or a function parameter, the points-to analysis performed by the compiler is interprocedural, if the compiler compiles in the whole-program mode. In one embodiment, in order to build the dependence graph more accurately, a series of array dependence tests may be performed, so that each element in an array is disambiguated in building the dependence graph, if all the array accesses are finite expressions. Otherwise, approximation is used. Furthermore, each field in a structure may be disambiguated.

Referring back to FIG. 8, at block 802, the processing logic performs a slicing operation on the main thread using the dependent graph. During slicing, according to one embodiment, the compiler first identifies the load addresses of delinquent loads as slice criteria, which specify the intermediate slicing results. After building the dependence graph, the compiler computes the program slices of the identified slice criteria. The program slices of the slice criteria are defined as the set of instructions that contribute to the computation of the addresses for memory prefetches executed by the one or more helper threads. Slicing can reduce the code to only the instructions relevant to the computation of an address, thus allows the helper threads to run quicker and ahead of the main thread. The compiler only needs to copy instructions in a slice to the helper thread's code.

According to one embodiment, slicing in the compiler extracts a minimal sequence of instructions to produce the addresses of delinquent loads by transitively traversing the dependence edges backwards. The leaf nodes on the dependence graph of the resulting slices can be converted to prefetch instructions, because no further instructions are dependent on those leaf nodes. Those prefetch instructions executed by a processor, such as the Pentium™ 4 from Intel Corporation, are both non-blocking and non-faulting. Different prefetch instructions exist for bringing data into different levels of cache in the memory hierarchy.

According to one embodiment, slicing operations may be performed with respect to a given code region. Traversal on the dependence graph in a given region must terminate when it reaches code outside of that region. Thus, slicing must be terminated during traversal instead of after traversal, because the graph traversal may span to the outside of a region and then back to the inside of a region. Simply collecting the slices according to regions after the traversal may lose precision.

In a further embodiment, the compiler slices each delinquent loads instruction one by one. To minimize the duplication of code in helper threads and reduce the overhead of thread invocation and synchronization, the compiler merges slices into one helper thread if they are in the same precomputation region.

Referring back to FIG. 8, at block 803, the processing logic performs scheduling across the threads to overlap multiple prefetches. In one embodiment, since Hyper-Threading processors support out-of-order execution with large scheduling windows, the processors can look for independent instructions beyond the current executing instruction when it waits on a pending cache miss. This aspect of out-of-order execution can provide substantial performance gain over an in-order processor and reduce the need for chaining speculative precomputation. Furthermore, the compiler selects basic speculative precomputation for Hyper-Threading processors. Namely, only one helper thread is scheduled at a time to save the thread spawning and communication overhead. Another benefit from using basic speculative precomputation is that it does not inundate the memory system on our Hyper-Threading processors as fast as chaining speculative precomputation does. When the out-of order processor looks for independent instructions for execution, those instructions can generate too many load requests and saturate the memory system. When the helper threads issue prefetching requests, a large number of outstanding misses could rapidly fill up the miss buffer and, as a result, stall the processor. Thus, the compiler needs to be judicious in spawning helper threads. Finally, to ensure timely prefetching, the compiler pins down the single helper thread and the main thread on respective logical processors.

Referring back to FIG. 8, at block 804, processing logic selects a communication scheme for the threads. In one embodiment, the compiler provides a module that computes live-ness information for any given slice, or any subset of program. Liveness information provides estimates on the communication cost. The information is used to select the precomputation region that provides good trade-off between communication and computation. The liveness information may help find triggers or the points at which the backward slicing ends.

Because the typical Hyper-Threading processors issue three micro-ops per processor cycle and use some hard-partitioned resources, the compiler has to be judicious as not to let helper threads slow down the main thread's execution, especially if the main thread issues three micro-ops for execution per cycle already. For the loop nest encompassing delinquent loads, the compiler makes trade-off between re-computation and communication in choosing the loop level for performing speculative precomputation. For each loop level, starting from the innermost one, according to one embodiment, the compiler selects one of the communication-based scheme and computation-based scheme.

According to one embodiment, the communication-based scheme communicates the live-in values from the main thread to the helper thread in each iteration, so the helper thread does not need to re-compute the live-in values. The compiler will select this scheme if there exists an inner loop encompassing most delinquent loads and if slicing for the inner loop significantly decreases the size of a helper thread. However, this scheme will be disabled if the communication cost for the inner loop level is very large. The compiler will give smaller estimate of communication cost, if the live-in values are computed early and the number of live-ins is small.

Communication-based scheme will create multiple communication points between the main thread and its helper thread at runtime. Communication-based scheme is important for Hyper-Threading processors, because relying on only one communication point by recomputing the slice in the helper thread may create too much resource contention between threads. This scheme is similar to constructing a do-across loop in that the main thread initiates the next iteration after it finishes computing the live-in values for that iteration. The scheme trades communication for less computation.

According to one embodiment, the computation-based scheme assumes only one communication point between two threads to pass in the live-in values in the beginning. Afterwards, the helper thread needs to compute everything it needs to generate accurate prefetch addresses. The compiler will select this scheme if there is no inner loop, or if slicing for this loop level does not significantly increases the size of a helper thread. Computation based scheme gives the helper thread more independence in execution, once the single communication point is reached.

According to one embodiment, to select the loop level for speculative precomputation, the compiler selects the outermost loop that benefits from communication based scheme. Hence the scheme-selection algorithm described above can terminate once it finds a loop with communication-based scheme. If the compiler does not find any loop with communication-based scheme, the outermost loop will be the targeted region for speculative precomputation. After the compiler selects the precomputation regions and their communication schemes, locating good trigger points in the main thread would ensure timely prefetches, while minimizing the communication between the main thread and the helper threads. Liveness information helps locate triggers, which are the points at which the backward slicing ends. Slicing beyond the precomputation region ends when the number of live-ins increases.

Referring back to FIG. 8, at block 805, the processing logic determines a synchronization period for the threads to synchronize with each other during the execution. According to one embodiment, the synchronization period is used to express the distance between a helper thread and the main thread. Typically, the helper thread performs all of its precomputation in units of synchronization period. This both minimizes communication and limits the possibility of producing run-away helpers. Because the compiler computes the value of synchronization period and generates synchronization code accordingly, special hardware support, such as Outstanding Slice Counter, is no longer needed.

If the synchronization period is too large, the prefetch induced by the helper thread could not only displace temporally important data to be used by the main thread but also potentially displace earlier prefetched data that have not been used by the main thread. On the other hand, if the synchronization period is too small, the prefetch could be too late to be useful. To decide on the value of synchronization period, according to one embodiment, the compiler first computes the difference between the length of the slice and the length of program schedule in the main thread. If the difference is small, the run-ahead distance induced by the helper thread in one iteration is consequently small. Multiple iterations may be needed by the helper thread to maintain enough run-ahead distance. Hence, the compiler increases the synchronization period if the difference is small, and vice versa.

Thereafter, the compiler generates code for the main thread and the helper thread during a code generation stage. During the code generation stage, the compiler builds a thread graph as the interface between the analysis phase and code generation phase. Each graph node denotes a sequence of instructions, or a code region. The invocation edge between the nodes denotes the thread-spawning relationship, which is important for specifying chaining helper threads. Having a thread graph enables code reuse because, according to one embodiment, the, compiler also allows the user to insert pragmas in the source program to specify the code for helper threads and the live-ins. Both the pragma-based approach and the automatic approach share the same graph abstraction. As a result, the helper thread code generation module may be shared.

The helper thread code generation leverages multi-entry threading technology in the compiler to generate helper thread code. In contrast to the conventional, well-known out-lining, the compiler does not create a separate compilation unit (or routine) for the helper thread. Instead, the compiler generates a threaded entry and a threaded return for in the helper thread code. The compiler keeps all newly generated helper thread codes intact or inlined within the same user-defined routine without splitting them into independent sub-routines. This method provides later compiler optimizations with more opportunities for performing optimization on the newly generated helper threads. Fewer instructions in the helper thread means less resource contention on a hyper-threaded processor. This demonstrates that using helper threads for hiding latency incurs fewer instructions and less resource contention than the traditional symmetric multi-threading model, which is important especially because the hyper-threaded processor issues three micro-ops per processor cycle and has some hard-partitioned resources.

According to one embodiment, the generated codes for helper threads will be reordered and optimized by the later on phases in the compiler such as partial dead-store elimination (PDSE), partial redundancy elimination (PRE), and other scalar optimizations. In that sense, the helper thread code needs to be optimized to minimize the resource contention due to the helper thread. However, those further optimizations may remove prefetching code as well. Therefore, the leaf delinquent loads may be converted to the volatile-assign statements in the compiler. The leaf node in the dependence graph of a slice implies that no further instructions in the helper thread depend on the loaded value. Hence, the destination of the volatile-assign statement is changed to a register temp in the representation to speed up the resulting code. Using volatile-assign may prevent all later on compiler global optimizations from removing generated prefetches for delinquent loads.

According to one embodiment, the compiler aims at ensuring the helper thread to run neither too far ahead nor behind the main thread using a self-counting mechanism. According to one embodiment, value X is pre-set for run-ahead distance control. The X can be modified through a compiler switch by users, or based on program analysis of the length of slice (or helper code) and the length of main code. In one embodiment, the compiler generates mc (M-counter) with an initial value X for main thread and hc (H-counter) with an initial value 0 for helper thread, and the compiler generates the counter M and H for counting the sync-up periods in main and helper code. The idea is that the all four counters (mc, M, hc, H) perform self-counting. The helper thread has no inference to main thread. If the helper thread runs too far ahead of main thread, it will issue a wait, if the helper thread runs behind main thread, it will perform a catch-up.

In a particular embodiment, for every X loop-iterations, the main thread issues a post to ensure that the helper is not waiting and can go ahead to perform non_faulting_load. At this point, if the helper thread waits for the main thread after issuing a number of non_faulting_loads in chunks of sync-up period, it will wake up to perform non_faulting_loads. In another particular embodiment, for every X loop-iterations, the helper thread examines whether its hc counter is greater main thread's mc counter and the hc counter is greater a sync-up period H*X of the helper thread, if so, the helper will issue a wait and go to sleep. This prevents the helper thread from running too far ahead of the main thread. In a further embodiment, before iterating over another chunk of sync-up period, the helper thread examines whether its hc counter is smaller than the main thread's mc counter. If so, the helper thread has fallen behind, and must "catch-up and jump ahead" by updating its counter hc and H and all capture private and live-in variable from the main thread. FIGS. 9A-9C are diagrams illustrating exemplary pseudo code of an application, a main thread, and a helper thread according to one embodiment. Referring to FIGS. 9A-9C, the compiler compiles a source code 901 of an application and generates code for a main thread 902 and a helper thread 903 using at least one of the aforementioned techniques. It will be appreciated that the code 901-903 are not limited to C/C++. Other programming languages, such as Fortran or Assembly, may be used.

After the code for the helper threads have been created, the compiler may further allocate, statically or dynamically, resources for each helper thread and the main thread to ensure that there is no resource conflict between the main thread and the helper threads, and among the helper threads. Hardware resources, such as register contexts, may be managed for helper threads within the compiler. Specifically, the register set may be statically or dynamically partitioned between the main thread and the helper threads, and between multiple helper threads. As a result, the live-in/live-out register copies via memory for threads may be avoided and the threads may be destroyed at compile-time, when the compiler runs out of resources, or at runtime when infrequent cases of certain main thread event occurs.

According to one embodiment, the compiler may "walk through" the helper threads in a bottom-up order and communicates the resource utilization in a data structure, such as a resource table shown in FIG. 12. The parent helper thread, which may be the main thread, utilizes this information and ensures that its resources don't overlap with the thread resources. When the thread resources penalize the main execution thread, for example by forcing the main thread to spilYfill registers, the compiler can kill previously created threads.

Figure 10:
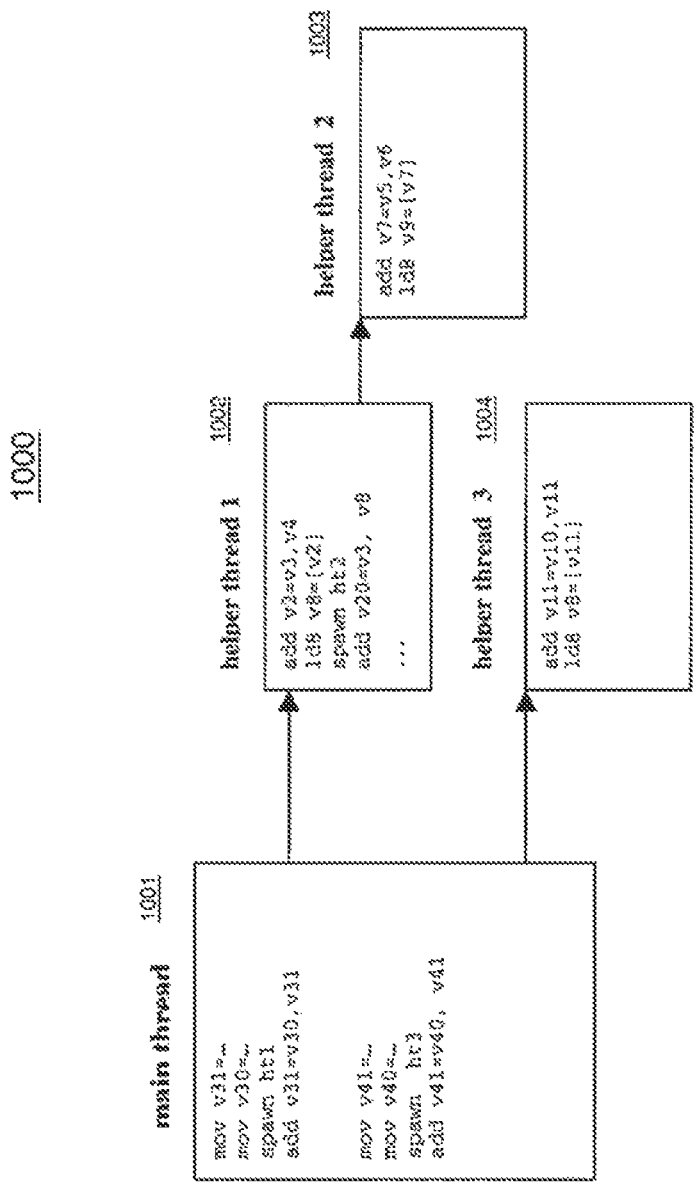
FIG. 10 is a block diagram illustrating an exemplary thread configuration according to one embodiment.

FIG. 10 is a block diagram illustrating an exemplary configuration of threads according to one embodiment. In this embodiment, exemplary configuration 1000 includes a main thread 1001 (e.g., a parent thread) and three helper threads (e.g., child threads) 1002-1004, which may be spawned from the main thread 1001, while thread 1003 may be spawned from thread 1002 (e.g., helper thread 1002 is a parent thread of helper thread 1003). It will be appreciated that the helper threads are not limited to three helper threads, more or less helper threads may be included. The helper threads may be spawned by a spawn instruction and the thread execution may resumes after the spawn instruction.

The threads are created by the compiler during a thread creation phase, such as those operations shown in FIGS. 5-8. According to one embodiment, the compiler creates the threads in the thread creation phase and allocates resources for the threads in a subsequent thread resource allocation phase. Dynamically and typically, a helper thread is spawned when its parent thread stalls. Exemplary configuration 1000 may happen during a page fault or a level 3 (L3) cache miss.

It is crucial that a thread can only share incoming registers (or resources in general) with a parent thread. For example, referring to FIG. 10, when main thread 1001 needs a register, it writes a value to register R10 before it spawns helper thread 1002 and uses register R10 after the helper thread 1002 terminates. Neither the helper thread 1002 nor any of its children (in the example, helper thread 1003 is the only children of helper thread 1002, and helper threads 1002 and 1004 are children of the main thread 1001) can write to register R10. Otherwise they would destroy the value in the main thread 1001. This would result in incorrect program execution. To avoid this resource conflict, according to one embodiment, the compiler may partition the resources statically or dynamically.

According to one embodiment, the compiler allocates resources for the helper threads and the main thread in a bottom-up order. FIG. 11 is a block diagram illustrating an exemplary pseudo code for allocating resources for the threads according to one embodiment. That is, in the exemplary algorithm 1100, the compiler allocates all resources for the helper threads in a bottom-up order (block 1101) and thereafter allocates resources for the main thread (block 1102) based on the resources used by the helper threads to avoid resource conflicts.

For the purposes of illustration, the resources used the threads are assumed to be the hardware registers. However, similar concepts may be applied to other resources apparent to one with ordinary skill in the art, such as memory or interrupt. Referring to FIG. 10, the compiler partitions the registers dynamically by walking bottom up from the lead thread of a thread chain. In this example, helper thread 1003 is a leaf thread in the first thread chain including helper thread 1002. Helper thread 1004 is a leaf thread in the second thread chain. The compiler records the register allocation in each helper thread in a data structure, such as a resource table similar to the exemplary resource table 1200 of FIG. 12. Then the parent thread reads the resource allocation of its children thread and does its allocation and reports it in its resource table.

FIG. 12 is a block diagram illustrating an exemplary resource data structure according to one embodiment. Exemplary data structure 1200 may be implemented as a table stored in a memory and accessible by a compiler. Alternatively, exemplary data structure 1200 may be implemented in a database. In one embodiment, exemplary data structure 1200 includes, but not limited to, written resources 1202 and live-in resources 1203 used by the respective thread identified via thread ID 1201. Other configurations may exist.

Referring to FIGS. 10 and 12, according to one embodiment, at the beginning, the registers of helper thread 1003 (e.g., the thread having the most bottom order in a bottom-up scheme) are allocated. The live-in values are V5 and V6 and assuming they are assigned to registers R2 and R3 respectively. Also, V7 gets register R4 assigned and V9 gets register R5 assigned. The resource table for helper thread 1003 includes live-in =((V5, R2), (V6, R3)) and register written= (R4, R5), as shown in FIG. 12. In helper thread 1002, the compiler replaces V5 with R2 and V6 with R3 during the allocation and marks register R4 and R5 (written in helper thread 1003) as live at the spawn instruction. This prevents register usage of R4 or R5 across the spawn point of helper thread 1003 and thus prevents a resource conflict between helper thread 1002 and helper thread 1003. For helper thread 1002, the live-in values are V3 and V4 and are assigned to register R6 and R7 respectively. When V8 and V20 are assigned to registers R8 and R9 respectively, the resource table for helper thread 1002 includes live-in =((V3, R6), (V4, R7)) and written registers=(R2, R3, R4, R5, R8, R9), as shown in FIG. 12. The written registers are the live-in registers for helper thread 1003 (e.g., R2 and R3), the written registers in helper thread 1003 (e.g., R4 and R5) and the registers written in helper thread 1002 (e.g., R8 and R9). Then the compiler allocates the registers for helper thread 1004. When the registers are allocated for all the helper threads, it allocates the registers for the main thread 1001.

In addition, according to one embodiment, when the compiler runs out of registers, it can delete one or more helper threads within the chain. This can happen for example, when the main thread runs out of registers, because the helper thread chain is too deep or a single helper thread needs too many registers and the main thread has to spill/fill registers. The compiler can apply heuristics to either allow certain number of spills or delete the entire helper thread chain or some threads in the thread chain. An alternative to deleting helper thread is to explicitly configure the weight of context save/restore, so that upon context switch, the parent's live registers that could be written by the helper thread's execution can be saved automatically by the hardware. Even though this context switch is relatively expensive, potentially such case is infrequent case. Moreover, such fine-grain context switch is still of much low overhead compared to full-context switch as used in most 0s-enabled thread switch or a traditional hardware based full-context thread switch.

Furthermore, when there is a conflict for live-in registers, for example, if helper thread 1003 overwrote a live-in register (e.g., mov v5= . . . ) and this register is also used in helper thread 1002 after the spawn of helper thread 1003, there would be a resource conflict for the register assigned to v5 (in this example, register R2). To handle this information, the compiler would use availability analysis and insert compensation code, such as inserting a mov v5'=v5 instruction before spawning helper thread 1003 and replacing v5 by v5' after the spawn.

Figure 13:
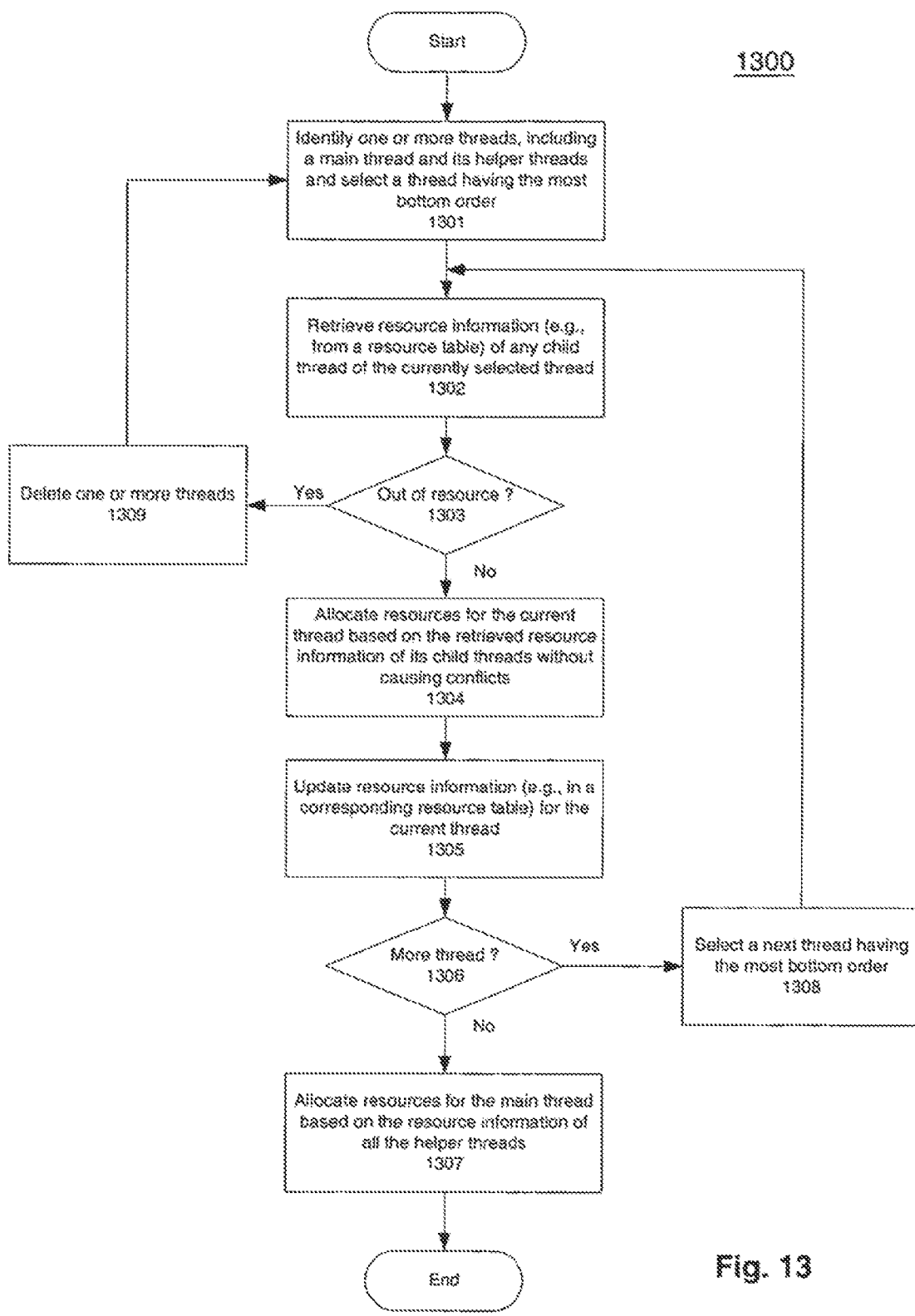
FIG. 13 is a flow diagram illustrating an exemplary process for allocating resources for threads according to one embodiment.

FIG. 13 is a flow diagram illustrating an exemplary process for allocating resources for threads according to one embodiment. Exemplary process 1300 may be performed by a processing logic that may comprise hardware (circuitry, dedicated logic, etc.), software (such as is run on a general purpose computer system or a dedicated machine), or a combination of both. In one embodiment, exemplary process 1300 includes selecting, during a compilation of a code having one or more threads executable in a data processing system, a current thread having a most bottom order, determining resources allocated to one or more child threads spawned from the current thread, and allocating resources for the current thread in consideration of the resources allocated to the current thread's one or more child threads to avoid resource conflicts between the current thread and its one or more child threads.

Referring to FIG. 13, at block 1301, processing logic identifies one or more threads, including a main thread and its helper threads, and selects a thread having the most bottom order as a current thread. The threads may be identified using a thread dependency graph created during the thread creation phase of the compilation. At block 1302, the processing logic retrieves resource information of any child thread, which may be spawned from the current thread. The resources information may be obtained from a data structure corresponding to the child threads, such as resource table 1200 of FIG. 12. At block 1303, if there is no more resources available, the processing logic may delete one or more threads from the chain and restart over again (block 1309). If there is more resource available, at block 1304, the processing logic allocates resources for the current thread in consideration of resources used by its child threads without causing resource conflicts. Thereafter, at block 1305, the processing logic updates the resources allocated to the current thread in the associated resource table, such as resource table 1200. The above processes continue until no more helper threads (e.g., child threads of the main thread) remained (blocks 1306 and 1308). Finally, at block 1307, the processing logic allocates resources for the main thread (e.g., a parent thread for all helper threads) based on the resource information of all the helper threads without causing resource conflicts. Other operations may be included.

The above described techniques have been tested against a variety of benchmark tools based on a system similar to the following configurations:

| A Processor with Hyper-Threading Technology | |
|---|---|
| Threading | 2 logical processors. |
| Trace cache | 12k micro-ops. 8-way associative. 6 micro-ops per line. |
| L1 D cache | 8k bytes. 4-way associative. @-byte line size. 2-cycle integer access. 4-cycle FP access. |
| L2 unified cache | 256k bytes. 8-way associative. 128-byte line size. 7-cycle access latency. |
| Load buffers | 48 |
| Store buffers | 24 |

The variety of benchmark tools include at least one of the following:

| Benchmark | Description | Input Set |
|---|---|---|
| nbody_walker | Traverses nearest bodies from any node in Nbody graph | 20k bodies |
| mst | Computes Minimal Spanning Tree for data clustering | 3k nodes |
| em3d | Solves electromagnetic propagation in 3D | 20k 5-degree nodes |
| health | Hierarchical database modeling health care system | 5 levels |
| mcf | Integer programming algorithm used for bus scheduling | Lite |

Figure 14A:
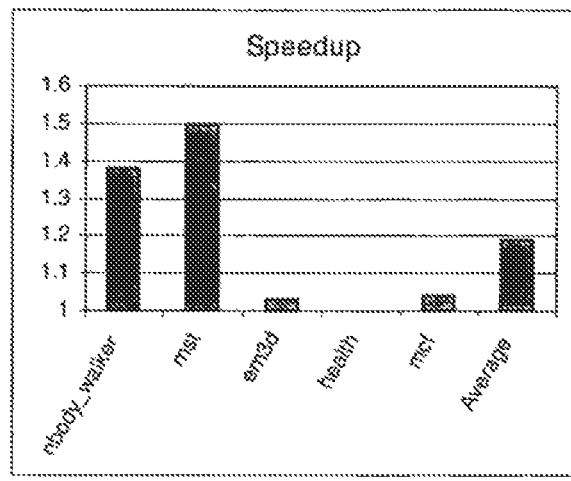
FIGS. 14A-14D show results of a variety benchmark tests using embodiments of techniques.
Figure 14B:
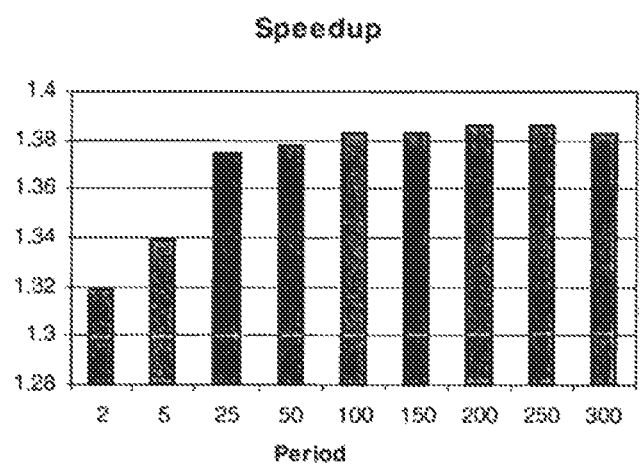
Figure 14C:
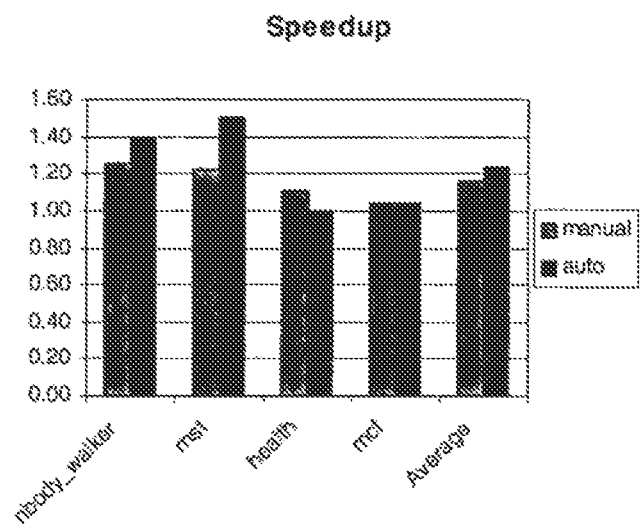
Figure 14D:
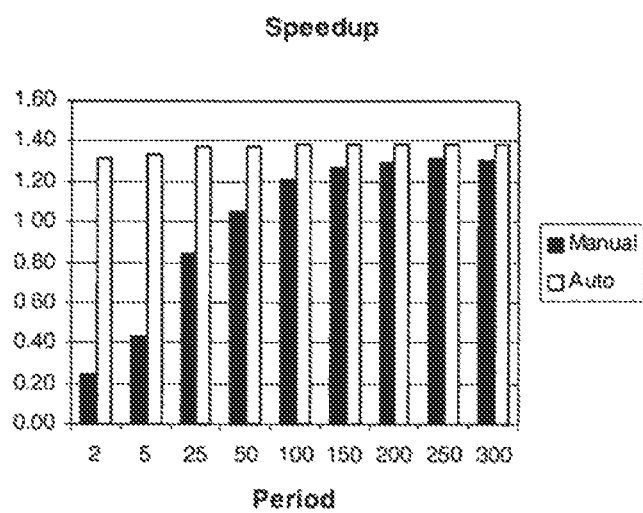

FIG. 14A is a chart illustrating an improvement of performance by the helper thread on nbody_walker benchmark utility. FIG. 14B is a chart illustrating a speedup result of nbody_walker at a given value of synchronization period. FIG. 14C is a chart illustrating an automatic process versus a manual process with respect to a variety of benchmark. FIG. 14D is chart illustrating an improvement of an automatic process over a manual process using nbody_walker at a given synchronization period.

Thus, methods and apparatuses for thread management for multi-threading have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
analyzing source codes of a main thread to identify helper thread candidate code regions, the source codes including one or more code regions, each code region corresponding to a sequence of instructions representing an iteration loop in the source codes, the one or more code regions sharing at least one instruction in the source codes;
estimating a communication cost to communicate live-in information computed by the main thread from the main thread to a helper thread for each code region;
estimating a computation cost to compute live-in information by the helper thread for each code region;
comparing the communication cost to the computation cost for each code region;
selecting a loop level represented by a code region from the one or more code regions for one or more helper threads with respect to the main thread based on a trade-off between the communication cost and the computation cost; and
generating codes for the one or more helper threads, the one or more helper threads being speculatively executed in parallel with the main thread to perform one or more tasks for the selected code region of the main thread.

2. The method as recited in claim 1, wherein the generated codes include synchronization code for the one or more helper threads to synchronize with the main thread during the execution.

3. The method as recited in claim 1, further comprising:
generating software codes for the main thread based on the source codes; and
slicing the generated software codes for the main thread to extract a reduced set of instructions relevant to one or more prefetching tasks for the selected region of the main thread;
wherein generating codes for the one or more helper threads comprises generating software codes for the one or more helper threads different from the generated software code for the main thread and including the reduced set of instructions, the one or more helper threads being speculatively executed in parallel with the main thread to perform the one or more prefetching tasks.

4. The method as recited in claim 3, wherein slicing the generated software codes further comprises extracting a minimal set of instructions relevant to the one or more prefetching tasks.

5. A machine-readable storage medium having executable code stored thereon, the code when executed on a machine, causes the machine to:
analyze source codes of a main thread to identify helper thread candidate code regions, the source codes including one or more code regions, each code region corresponding to a sequence of instructions representing an iteration loop in the source codes, the one or more code regions sharing at least one instruction in the source codes;
estimate a communication cost to communicate live-in information computed by the main thread from the main thread to a helper thread for each code region;
estimate a computation cost to compute live-in information by the helper thread for each code region;
compare the communication cost to the computation cost for each code region;
select a loop level represented by a code region from the one or more code regions for one or more helper threads with respect to the main thread based on a trade-off between the communication cost and the computation cost;
generate software codes for the main thread based on the source codes;

slice the generated software codes for the main thread to extract a reduced set of instructions relevant to one or more prefetching tasks for the selected region of the main thread; and generate software codes for the one or more helper threads different from the generated software code for the main thread and including the reduced set of instructions, the one or more helper threads being speculatively executed in parallel with the main thread to perform the one or more prefetching tasks;

wherein the generated software codes for the one or more helper threads include synchronization code for the one or more helper threads to synchronize with the main thread during the execution.

6. The medium as recited in claim 5, wherein analyzing the source codes further comprises instructions to:

generate one or more profiles for cache misses of the selected code region; and analyze the one or more profiles to identify one or more candidates for thread-based prefetch operations.

7. The medium as recited in claim 5, wherein generating the software codes for the one or more helper threads further comprises instructions to determine a synchronization period for the software codes for the one or more helper threads such that the helper thread is to perform its respective prefetching tasks within the synchronization period.

8. The medium as recited in claim 5, wherein slicing the generated software codes further comprises instructions to extract a minimal set of instructions relevant to the one or more prefetching tasks.

9. A method, comprising:

executing a main thread of an application in a multi-threading system; and spawning one or more helper threads from the main thread created from source codes including one or more code regions sharing at least one instruction in the source codes, each code region corresponding to a sequence of instructions representing an iteration loop in the source codes, each code region associated with an estimation of a communication cost to communicate live-in information computed by the main thread from the main thread to a helper thread and an estimation of a computation cost to compute live-in information by the helper thread, the one or more helper thread to perform one or more computations for the main thread when the main thread enters a loop level represented by a code region selected from the one or more code regions based on a trade-off between the estimation of communication cost and the estimation of computation cost, the one or more helper threads being created separately from the source codes of the main thread during a compilation of the source codes for the main thread.

10. The method as recited in claim 9, wherein the helper threads include synchronization code to synchronize with the main thread during the execution.

11. The method as recited in claim 9, wherein each helper thread comprises a reduced set of instructions extracted from the main thread relevant to one or more prefetching tasks for the selected code region of the main thread.

12. The method as recited in claim 11, wherein the reduced set of instructions comprises a minimal set of instructions relevant to the one or more prefetching tasks.

* * * * *